United States Patent
Davis (10) Patent No.: US 7,571,320 B2
(45) Date of Patent: Aug. 4, 2009

(54) CIRCUIT AND METHOD FOR PROVIDING SECURE COMMUNICATIONS BETWEEN DEVICES

(75) Inventor: Derek L. Davis, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 10/766,337

(22) Filed: Jan. 27, 2004

(65) Prior Publication Data

US 2004/0230799 A1    Nov. 18, 2004

Related U.S. Application Data

(63) Continuation of application No. 09/447,635, filed on Nov. 22, 1999, now abandoned.

(51) Int. Cl.
*H04L 9/00* (2006.01)
*G06F 11/30* (2006.01)
*H04L 9/30* (2006.01)
*H04L 9/26* (2006.01)

(52) U.S. Cl. .................. 713/169; 713/193; 380/30; 380/44

(58) Field of Classification Search ........... 713/169, 713/193
See application file for complete search history.

(56) References Cited

U.S. PATENT DOCUMENTS 5,703,952 A * 12/1997 Taylor ................ 380/44
6,173,400 B1 * 1/2001 Perlman et al. ........ 713/168
6,327,660 B1 * 12/2001 Patel ................. 713/193
2002/0169971 A1 * 11/2002 Asano et al. ........... 713/193

FOREIGN PATENT DOCUMENTS

WO    WO 9421066 A1 *    9/1994
WO    WO 99/55038          10/1999

OTHER PUBLICATIONS

Krawczyk, H. "New Hash Functions for Message Authentication", Advances in Cryptology, 1998, pp. 301-310.*
Hamdy S. Soliman, Mohammed Omari, "Application of synchronous dynamic encryption system in mobile wireless domains", Oct. 2005, Q2SWinet '05: Proceedings of the 1st ACM international workshop on quality of service & security in wireless and mobile networks, pp. 24-30.*
Krawczyk, H. "LFSR-Based Hashing and Authentication," Proceedings of the Annual International Cryptology Conference (CRYPTO), DE, Berlin, Springer, vol. Conf. 14, Aug. 21, 1994, pp. 129-139, XP000467659, ISBN: 3-540-58333-5.

* cited by examiner

*Primary Examiner*—Matthew B Smithers
*Assistant Examiner*—Courtney D Fields
(74) *Attorney, Agent, or Firm*—Blakely, Sokoloff, Taylor & Zafman LLP (57) ABSTRACT

An electronic system and method for providing secure communications between devices. The secure communications are maintained through use of an integrity check value (ICV) that accompanies a message. The ICV is used to determine whether the contents of a message have been modified during transmission. An efficient technique for producing the ICV involves bitwise arithmetic operations and "exclusive OR" operations between data associated with the message (in its non-encrypted format) and coefficients of a matrix. The "coefficients" are selected bits from a pseudo-random data stream created by a cipher engine from keying material used in communications between the devices.

18 Claims, 8 Drawing Sheets

CIRCUIT AND METHOD FOR PROVIDING SECURE COMMUNICATIONS BETWEEN DEVICES

CROSS-REFERENCES TO RELATED APPLICATIONS

This is a continuation of U.S. application Ser. No. 09/447,635 filed Nov. 22, 1999, now abandoned.

BACKGROUND

1. Field

The present invention relates to the field of cryptography. More particularly, the present invention relates to a circuit and method for providing secure communications between devices.

2. General Background

It is well known that computers can be used to process and store sensitive information in a digital form. For example, computers may be used to conduct financial transactions such as adjusting credit card or bank account balances, metering electronic content usage, and the like. Due to the sensitive nature of this information, it has become necessary to ensure that its integrity is protected during transmission between devices in different computers as well as between devices within the same computer.

A number of cryptographic techniques are available to establish secure communications between two devices. Herein, communications are deemed "secure" when information sent over a normally unprotected communication medium is protected against observation, tampering, and replay of previously-recorded valid information. Some of these available cryptographic techniques involve a block cipher function and/or a stream cipher function.

Figure 1:
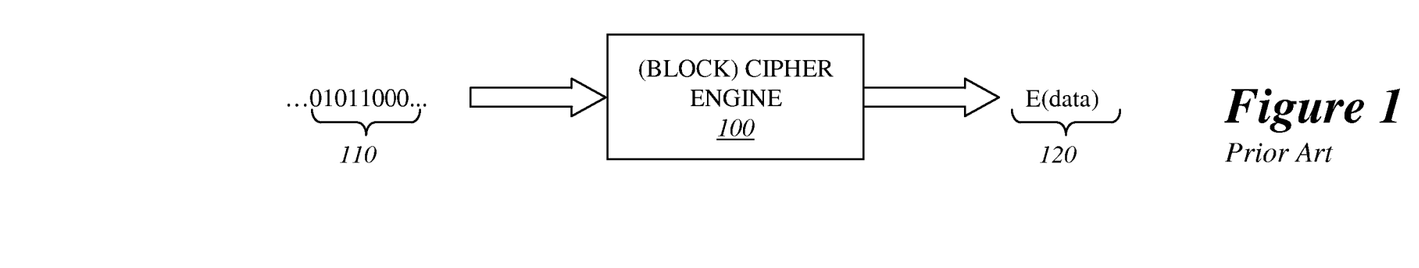
FIG. 1 is an illustrative embodiment of the general functionality of a conventional block cipher function.

Referring to FIG. 1, an illustrative embodiment of the general functionality of a conventional block cipher function is shown. In particular, a group of data bits (referred to as "incoming data") 110 is loaded into a cipher engine 100. Normally, (block) cipher engine 100 is software that produces an encrypted output "E(data)" 120 by successively encrypting groups of bits at a time in accordance with a predetermined symmetric key encryption function. One example of a symmetric key encryption function includes Data Encryption Standard (DES) as set forth in Federal Information Processing Standards Publication 46-2 published on or around Dec. 30, 1993. A significant disadvantage associated with many block cipher functions is that they cannot support secure communications at a high transmission rate. Rather, significant latency is realized between the receipt of incoming data 110 and the production of encrypted output 120.

Figure 2:
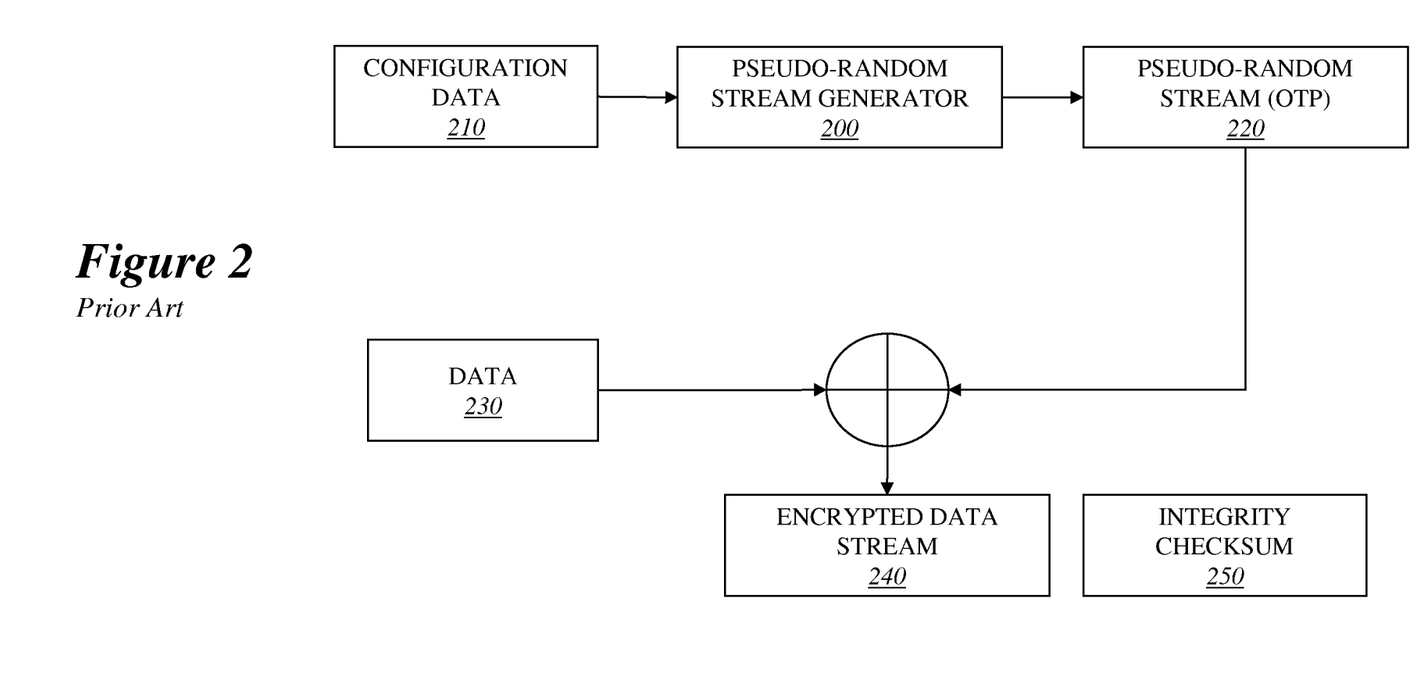
FIG. 2 is an illustrative embodiment of the general functionality of a conventional stream cipher function.

As shown in FIG. 2, an illustrative embodiment of the general functionality of a conventional stream cipher function is shown. In particular, a set of bits (referred to as "configuration data") 210 is loaded into a cipher engine acting as a pseudo-random stream generator 200. When configuration data 210 is keying material, a pseudo-random stream generator 200 produces a pseudo-random stream 220 that can operate effectively as a One-Time Pad (OTP). Namely, pseudo-random stream 220 may be used to encrypt (or decrypt) data 230 by exclusively OR'ing (XOR'ing) data 230 with pseudo-random stream 220. This operation produces an encrypted (or decrypted) data stream 240 and causes minimal latency because pseudo-random stream 220 may be pre-computed. While this approach protects against eavesdropping and replay attacks on the communication stream, it is extremely susceptible to tampering or inadvertent corruption because a targeted bit of data 230 may be altered in a coherent and intended manner by modifying a selected bit of encrypted data stream 240.

In an effort to overcome this tampering susceptibility, an integrity checksum 250 may be generated concurrently with encrypted data stream 240. Integrity checksum 250 accompanies encrypted data stream 240 and is used to determine whether data stream 240 has been modified during transmission. One type of integrity checksum is in accordance with DES Message Authentication Code (MAC), which is calculated using a block ciphering function. However, the use of a DES MAC integrity checksum in combination with stream ciphering would reintroduce the latency disadvantages realized by block ciphers.

Hence, it is desirable to develop an efficient and cost effective technique by which various devices may securely communicate with each other with minimal latency. Similarly, an integrity mechanism for such communication may alternatively be used in the absence of encryption to provide for a high-integrity, low-latency communication channel.

SUMMARY

Briefly, one embodiment of the invention is a method for securing communications between a first device and a second device. The method comprises (i) mutually authenticating the first device and the second device, (ii) generating an integrity check value by the first device, and (iii) sending the integrity check value with a message from the first device to the second device.

BRIEF DESCRIPTION OF THE DRAWINGS

The features and advantages of the present invention will become apparent from the following detailed description of the present invention in which.

DETAILED DESCRIPTION

The present invention relates to an electronic system and method for providing secure communications between devices. More specifically, secure communications are maintained through use of an integrity check value (ICV) that accompanies a message in an encrypted or non-encrypted format. The ICV is used to determine whether the contents of a message have been modified during transmission. As described below, an efficient technique for producing the ICV without experiencing high latency quantitative definition involves bitwise multiplication and "exclusive OR" operations between data associated with the message (in its non-encrypted format) and coefficients of a matrix. The "coefficients" are selected bits from a pseudo-random data stream created from keying material used in communications between two or more devices.

In the following description, certain terminology is used to describe certain features of the present invention. More specifically, an "electronic system" is defined as hardware implemented with a processor. Examples of an electronic system include a computer (e.g., laptop, desktop, hand-held, server, mainframe, etc.), imaging equipment (e.g., printer, facsimile machine, scanner, digital camera, etc.), set-top box (e.g., receiver or transceiver hardware for receipt of cable or satellite signals), wireless communication equipment (e.g., cellular phone), a consumer electronic appliance and the like. A "processor" includes logic capable of processing information such as a microprocessor, a microcontroller, a state machine and the like.

A "bus" is generally defined as any medium over which information may be transferred such as, for example, electrical wire, optical fiber, cable, plain old telephone system (POTS) lines, wireless (e.g., satellite, radio frequency "RF", infrared, etc.) and the like. "Information" is defined as data, address, control or any combination thereof. A "message" is generally defined as information intended to be transferred in a sequence of one or more transmissions.

With respect to cryptography related terminology, the term "secure" generally indicates a condition where information is protected against observation, productive tampering, and replay. "Keying material" includes any encoding and/or decoding parameter used by cryptographic functions (also referred to as "ciphers" or "cipher functions") such as Data Encryption Standard (DES) for example. One type of parameter is a "symmetric key" which is a device-shared key held in secrecy by two or more devices. Another type of parameter includes an "asymmetric key" featuring a first key (e.g., a public key) normally used for encryption and a second key (e.g., a "private" key) normally used for decryption. A "digital certificate chain" includes either a single digital certificate or an ordered sequence of digital certificates arranged for authorization purposes as described below, where each successive certificate represents the issuer of the preceding certificate.

Figure 3:
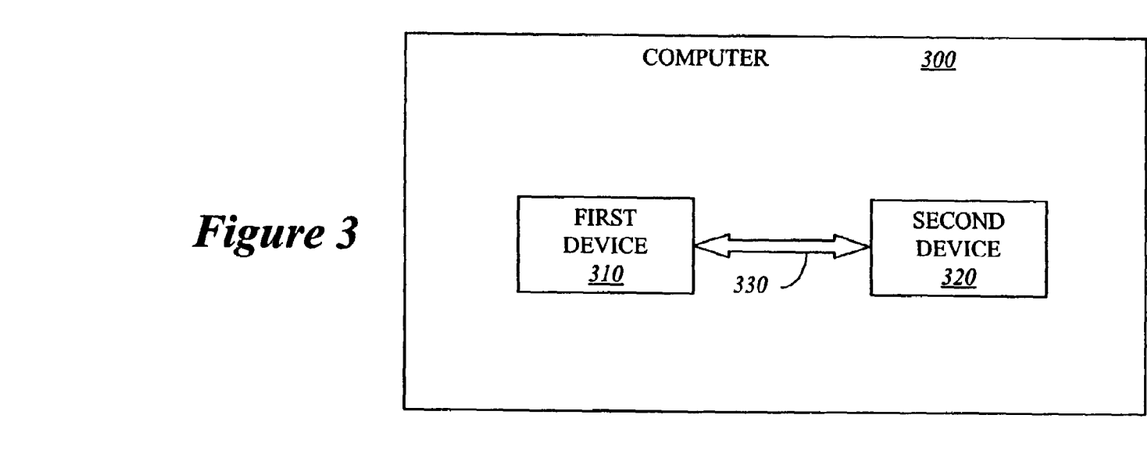
FIG. 3 an illustrative embodiment of an electronic system employing the present invention.

Referring to FIG. 3, an illustrative embodiment of an electronic system 300 employing the present invention is shown. Electronic system 300 comprises a first device (e.g., a processor) 310 and a second device 320. In this embodiment, second device 320 is a memory such as non-volatile memory (e.g., flash memory, any type of read only memory "ROM", battery-backed random access memory "RAM", or even volatile memory). First device 310 and second device 320 are placed in secure communications with each other over a bus 330. As a result, access to storage area of second device 320 can be restricted to only authenticated processing logic devices such as first device 310. Similarly, first device 310 is capable of authenticating second device 320 to achieve a high confidence level that data stored in second device 320 is valid.

Figure 4A:
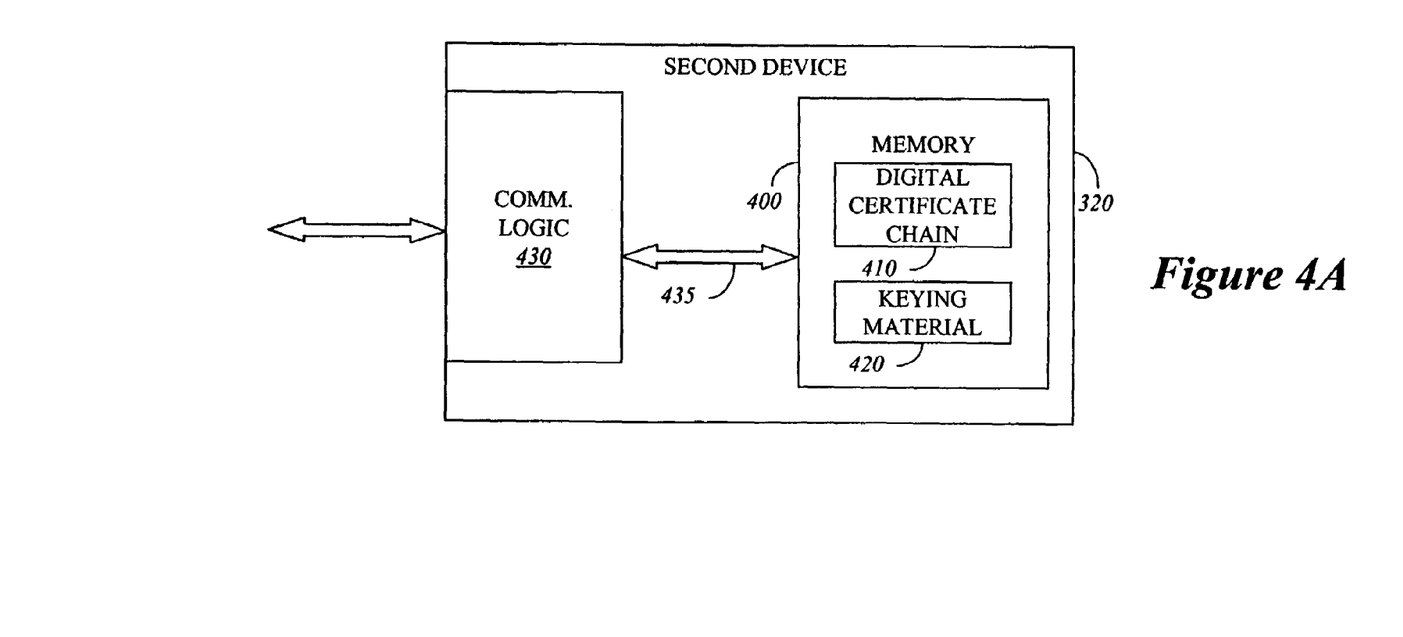
FIG. 4A is an illustrative embodiment of a second device of the electronic system of FIG. 3.
Figure 4B:
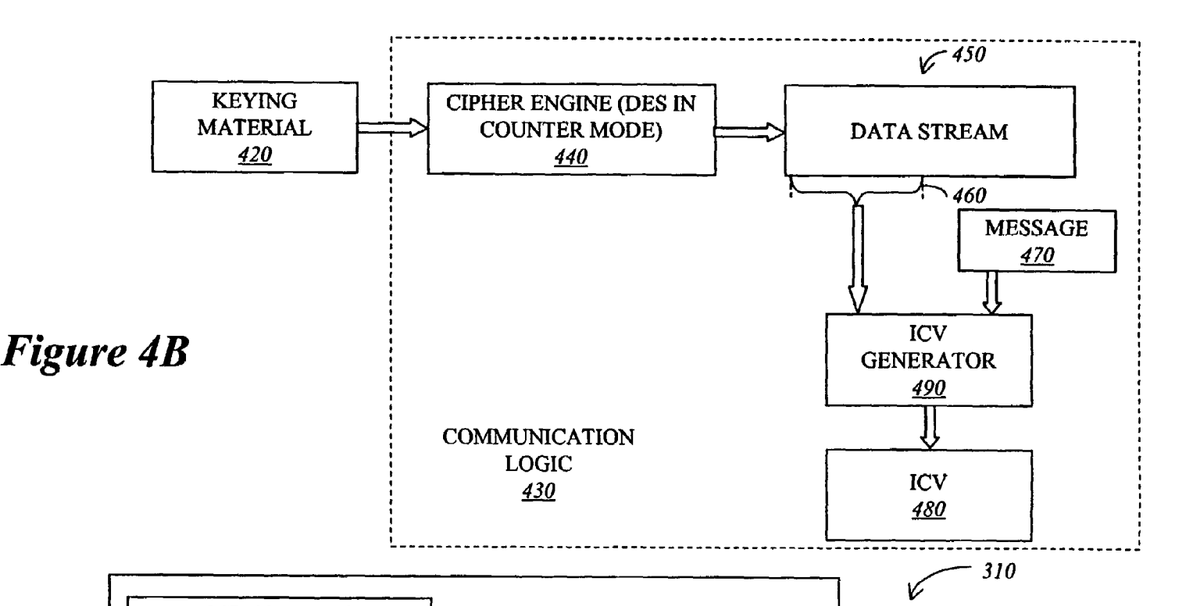
FIG. 4B is an illustrative embodiment of communication logic of the second device of FIGS. 3 and 4A.

Referring now to FIGS. 4A and 4B, an embodiment of second device 320 is shown. In FIG. 4A, second device 320 includes a memory 400 and a small amount of communication logic 430 coupled together through a bus 435. In this embodiment, memory 400 includes keying material 420 and/or at least one digital certificate chain 410, which are stored normally at manufacture. Of course, it is contemplated that digital certificate chain 410 and/or keying material 420 may be produced and stored in memory 400 after manufacture.

In one embodiment, keying material 420 includes at least a private key of a device-specific asymmetric key pair used by communication logic 430 within second device 320, namely its cipher engine, to (i) encrypt or decrypt the information, or (ii) establish a session key used for that purpose. The public key of the key pair is widely available to other systems as well as electronic system 300. For this embodiment, the "session" key is a temporarily key for use during a particular secure communications sequence and may be created in accordance with a well-known Diffie-Hellman technique as described in U.S. Pat. No. 4,200,770. Alternatively, keying material 420 may include a symmetric key, which may be used by cipher engines of both first device 310 and second device 320 to produce a session key. In lieu of or in addition to asymmetric and/or symmetric key(s), keying material 420 may temporarily store one or more session keys if memory 400 includes volatile memory.

As shown in FIG. 4B, communication logic 430 includes a cipher engine 440 designed to perform cryptographic operations in accordance with a selected stream cipher such as, for example, DES operating in counter mode. When loaded with keying material 420 such as a session key used in communications with first device 310 of FIG. 3, cipher engine 440 produces a pseudo-random data stream 450. This data stream 450 effectively operates as a One-Time Pad (OTP). For this embodiment, an ICV generator 490 is used to generate a N-bit ICV 480 based on a portion 460 (e.g., group of bits or bytes) of data stream 450 and data associated with a message 470. Optionally, this portion 460 may be used to generate N-bit ICV 480 based on address or other relevant information (e.g., data type) associated with message 470. The value of "N" is determined by requirements of attack resistance, and may range from 16 to 32 for example. It is contemplated that this or another portion of data stream 450 may be used for encrypting/decrypting message 470 and/or ICV 480.

Figure 5:
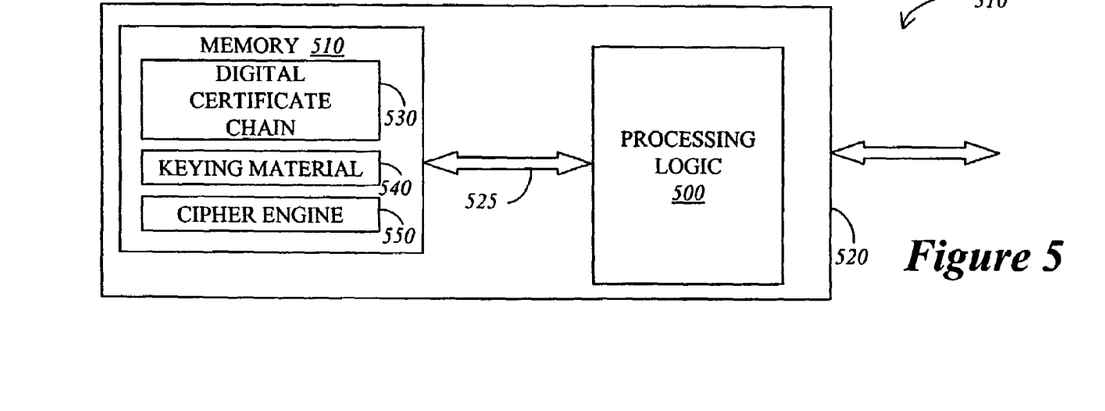
FIG. 5 is an illustrative embodiment of a first device of the electronic system of FIG. 3.

Referring to FIG. 5, an embodiment of first device 310 is shown. First device 310 includes processing logic 500 and a small amount of internal memory 510, each contained in a package 520 and coupled to a bus 525. Memory 510 may include at least one digital certificate chain 530 and keying material 540, each of which is stored either at manufacture or after manufacture. Keying material 540 includes (i) one or more keys of an asymmetric key pair (e.g., its private key), (ii) a symmetric key, and/or (iii) one or more session keys. A stream cipher engine 550, either software loaded in memory 510 as shown, a part of processing logic 500 or a combination of both, is used to produce an OTP for encryption/decryption and data integrity verification when using an ICV.

Figure 6A:
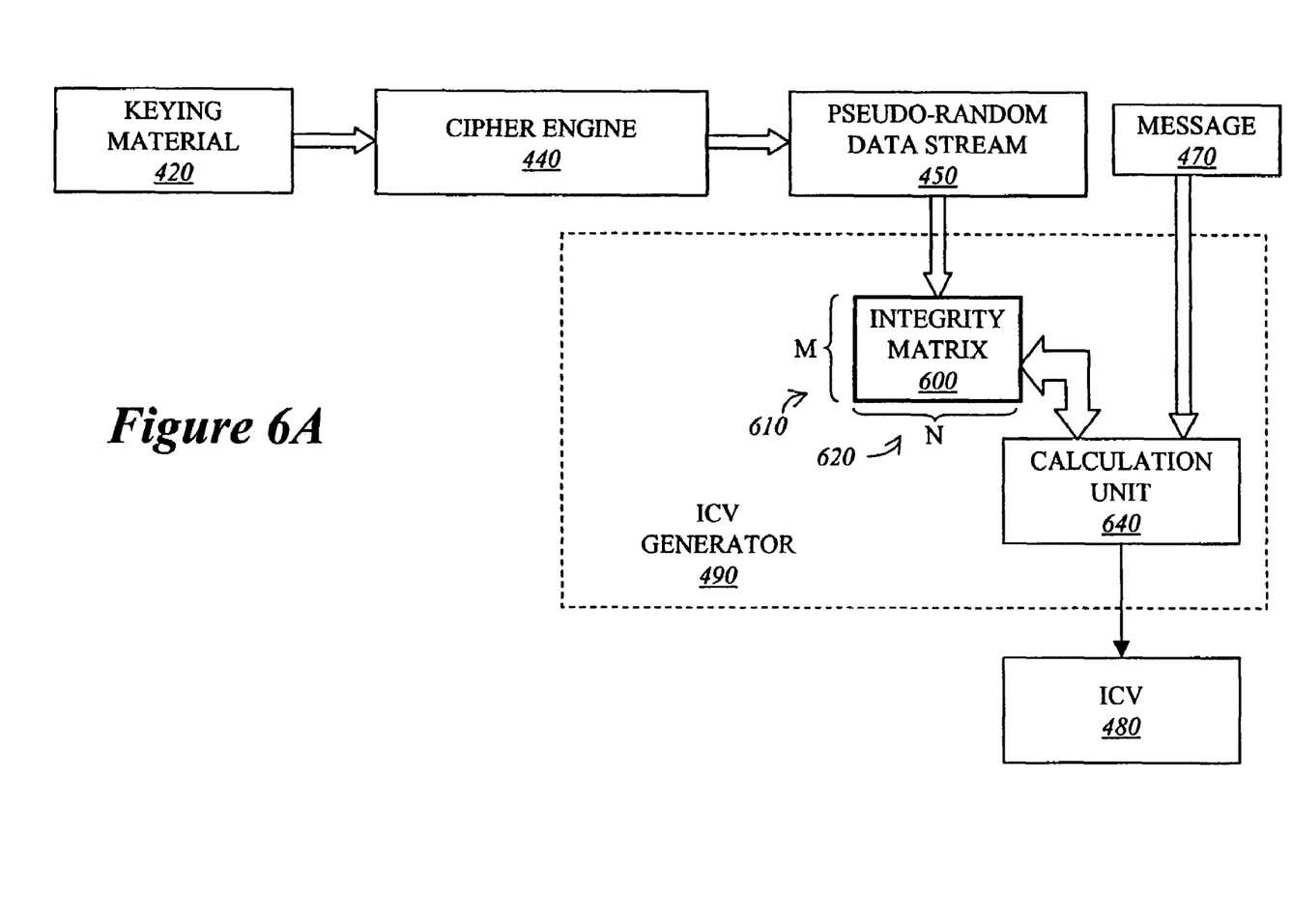
FIGS. 6A and 6B are illustrative block diagrams of a first embodiment of an integrity check value (ICV) generator employed in the second device of FIGS. 3 and 4A.
Figure 6B:
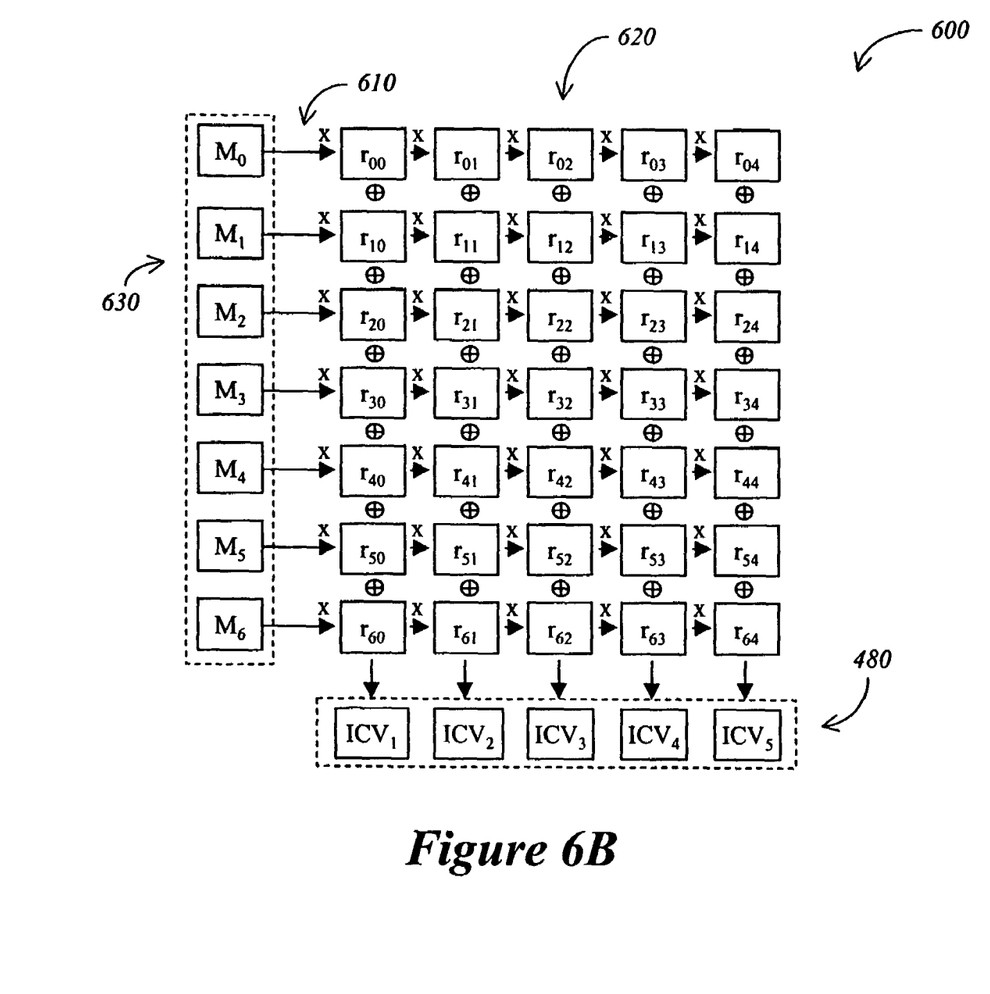

Referring now to FIG. 6A, a block diagram illustrating a first embodiment of an integrity check value (ICV) generator 490 of FIG. 4A that generates ICV 480 to accompany message 470 in an encrypted or non-encrypted format is shown. Cipher engine 440 produces pseudo-random data stream 450 based on keying material 420. For this embodiment, pseudo-random data stream 450 includes at least thirty-five bits ($r_{xy}$). A selected number of pseudo-random bits are extracted from pseudo-random data stream 450 in order to produce an integrity matrix 600. Herein, as shown in FIG. 6B, the selected pseudo-random bits include $r_{00}$-$r_{04}$, -$r_{10}$-$r_{14}$, $r_{20}$-$r_{24}$, $r_{30}$-$r_{34}$, $r_{40}$-$r_{44}$, $r_{50}$-$r_{54}$, and $r_{60}$-$r_{64}$ for example.

"Integrity matrix" 600 includes M rows 610, which corresponds to a group of M message bits 630 received for each transfer cycle in order to compute ICV 480 ("M" is a positive whole number). The number of reiterative transfer cycles needed to load the entire message and compute ICV is equivalent to the rounded-up whole number result of the size of the message (in bits) divided by M (in bits). Integrity matrix 600 further includes N columns 620, which dictate the size of ICV 480. Thus, the size of ICV 480 is programmable based on the selected column size (N) 620 of integrity matrix 600.

During computations of ICV 480, arithmetic and logic operations are performed by calculation unit 640 on message 470 and contents of integrity matrix 600. More specifically, each group of M message bits 630 is bitwise multiplied with each coefficient of a corresponding row of integrity matrix 600 to produce resultant values. As shown in FIG. 6B, message bits 630 include seven (M=7) bits identified as $m_0$-$m_6$.

Thereafter, the resultant values within each column of integrity matrix 600 are XOR'ed together to produce a bit of ICV 480. Thus, as shown in Table 1, since integrity matrix 600 includes five columns (N=5), ICV 480 is represented as a five bit result ($ICV_1$-$ICV_5$) and is computed as follows:

TABLE 1

| ICV bit | COMPUTED VALUE |
| --- | --- |
| $ICV_1$ | $m_0 r_{00}$ XOR $m_1 r_{10}$ XOR $m_2 r_{20}$ XOR $m_3 r_{30}$ XOR $m_4 r_{40}$ XOR $m_5 r_{50}$ XOR $m_6 r_{60}$ |
| $ICV_2$ | $m_0 r_{01}$ XOR $m_1 r_{11}$ XOR $m_2 r_{21}$ XOR $m_3 r_{31}$ XOR $m_4 r_{41}$ XOR $m_5 r_{51}$ XOR $m_6 r_{61}$ |
| $ICV_3$ | $m_0 r_{02}$ XOR $m_1 r_{12}$ XOR $m_2 r_{22}$ XOR $m_3 r_{32}$ XOR $m_4 r_{42}$ XOR $m_5 r_{52}$ XOR $m_6 r_{62}$ |
| $ICV_4$ | $m_0 r_{03}$ XOR $m_1 r_{13}$ XOR $m_2 r_{23}$ XOR $m_3 r_{33}$ XOR $m_4 r_{43}$ XOR $m_5 r_{53}$ XOR $m_6 r_{63}$ |
| $ICV_5$ | $m_0 r_{04}$ XOR $m_1 r_{14}$ XOR $m_2 r_{24}$ XOR $m_3 r_{34}$ XOR $m_4 r_{44}$ XOR $m_5 r_{54}$ XOR $m_6 r_{64}$ |

The changing of a single bit of message 470 results in the changing of statistically 50% of the integrity bits, but in an externally unpredictable pattern. Since the receiving device regenerates the ICV based on the incoming message and knowledge of the session key, and uses it to validate the incoming ICV, an attack on the message (whether in cyphertext or plaintext form) in an attempt to create a fraudulent message that will be accepted as valid, must also correctly compute a corresponding ICV. Since the attacker does not know the coefficients of the matrix (not knowing the session key that produces the pseudo random stream), the probability of success is only 1 in $2^N$.

Figure 7:
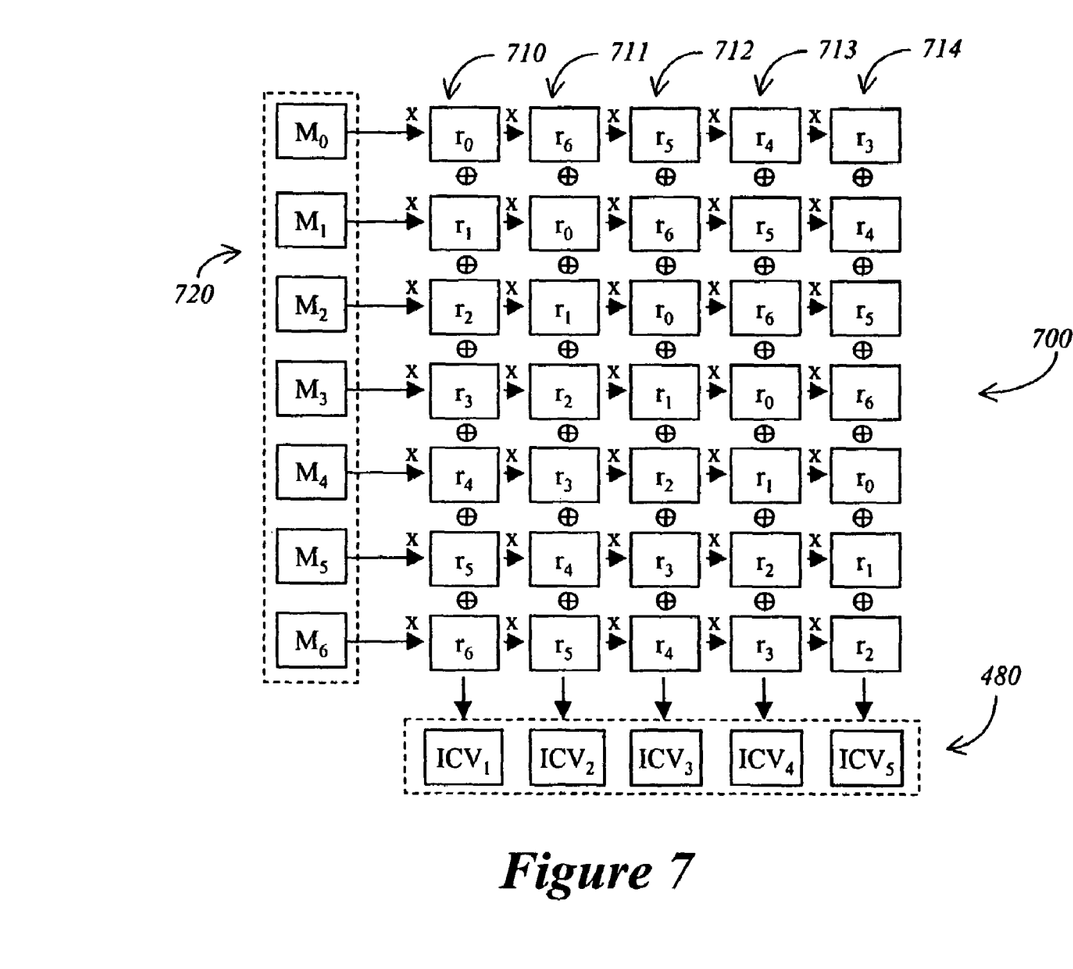
FIG. 7 is an illustrative block diagram of a second embodiment of the ICV generator employed in the second device of FIGS. 3 and 4A.

Referring now to FIG. 7, a block diagram illustrating a second embodiment of ICV generator 490 of FIG. 4A producing an ICV 480 to accompany a message in an encrypted or non-encrypted format is shown. This embodiment utilizes a Toplitz matrix 700 in lieu of integrity matrix 600 of FIGS. 6A and 6B. The reason is that it is expected that integrity matrix 600 would be changed in its entirety after each access. This places a significant bandwidth requirement on the pseudo-random bit stream generator.

As shown, Toplitz matrix 700 includes M bits in a first column 710. These bits are repeated in successive columns 711-714 of matrix 700, but are rotated by at least one position to fill matrix 700. Thus, only M bits of pseudo-random data are required to repopulate matrix 700 on each access (when M≧N). In this embodiment, N is less that or equal to M. Otherwise some bits of the resultant ICV would be identical and contribute nothing to increase tamper-resistance.

Figure 8A:
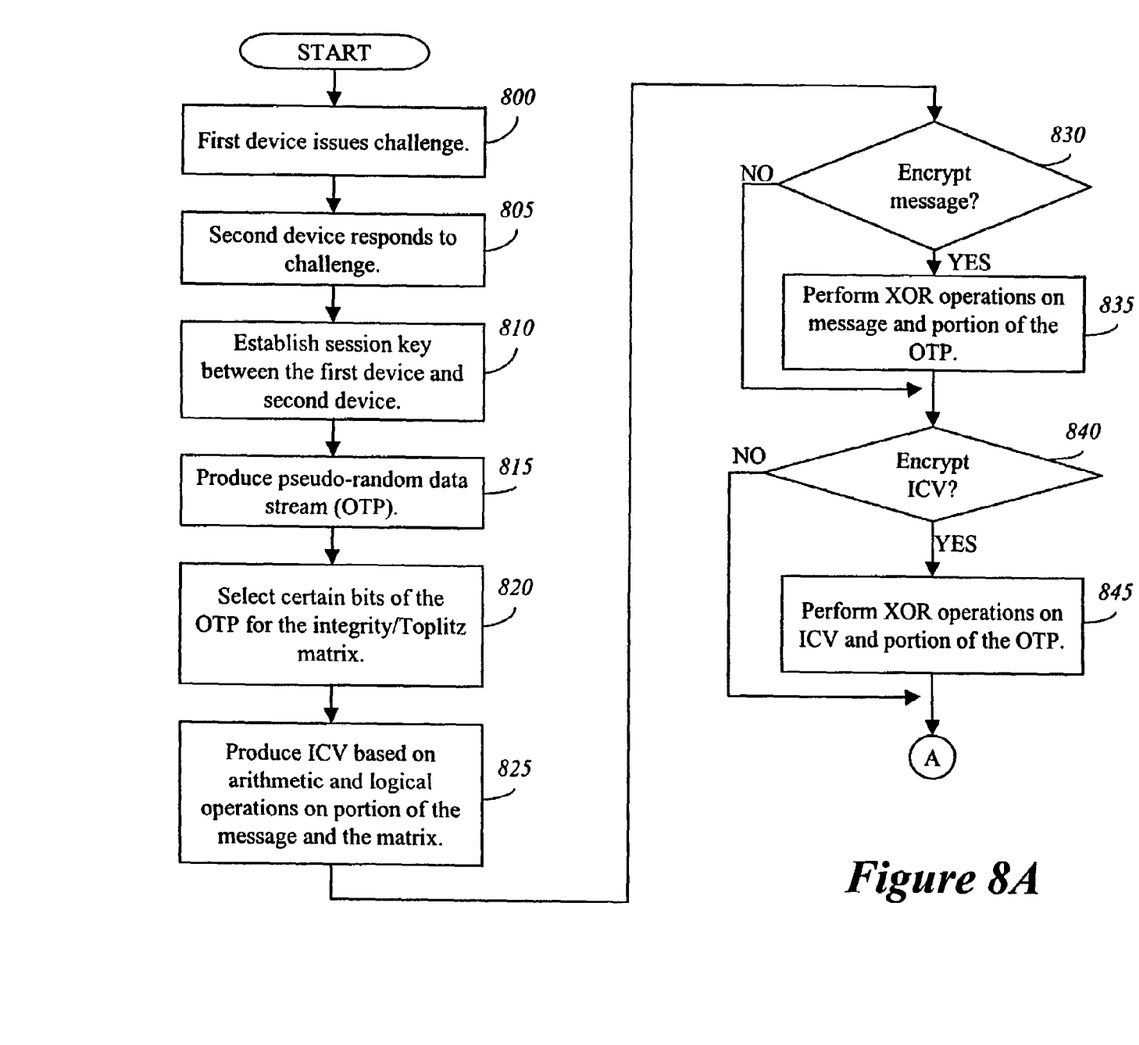
FIGS. 8A and 8B are illustrative flowcharts of the operations to establish and maintain secure communications between the first and second devices of FIG. 3.
Figure 8B:
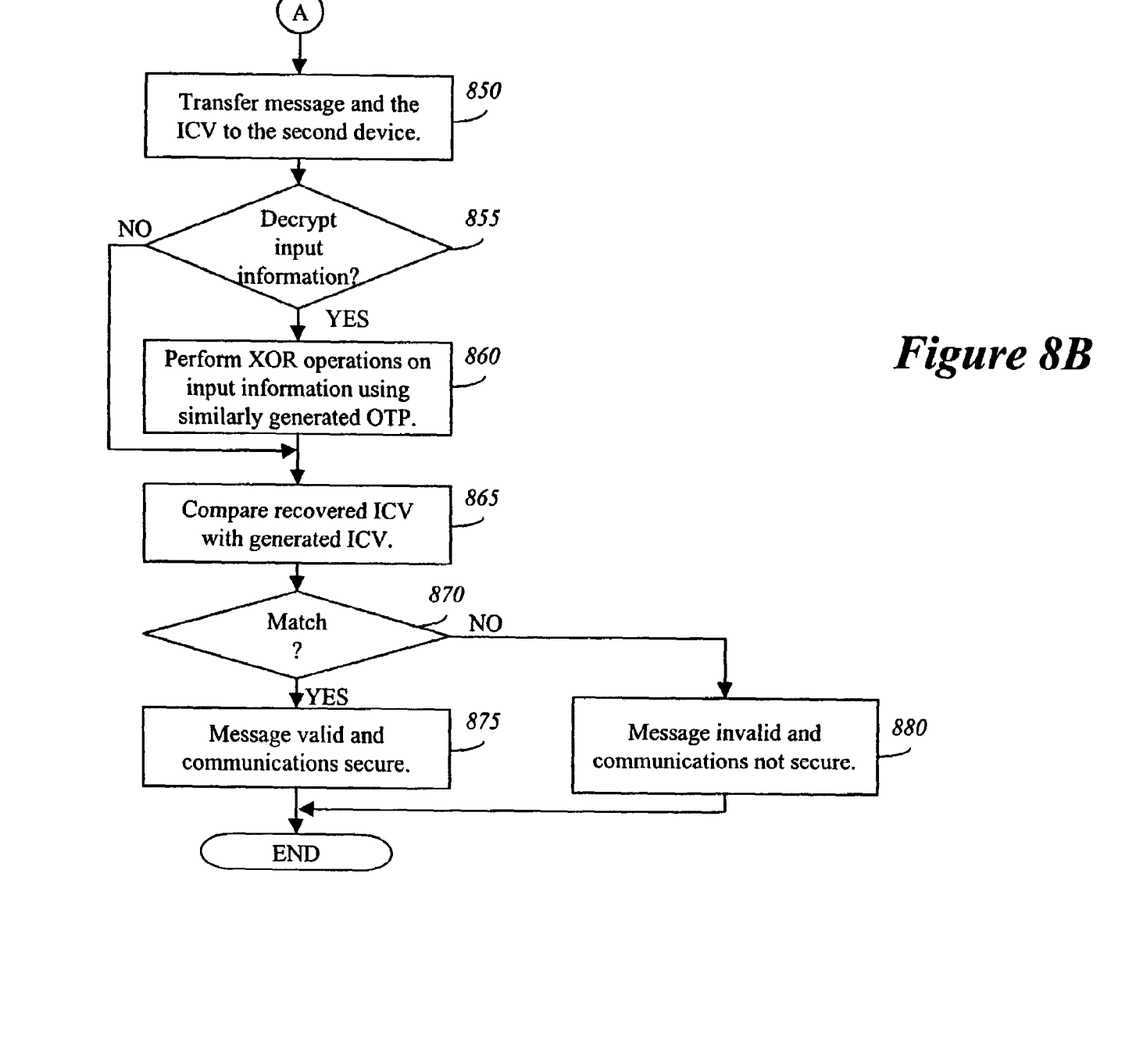

During computations of ICV 480, each group of M message bits 720 is bitwise multiplied with each pseudo-random bit of a corresponding row of matrix 700 as denoted by "x" in FIG. 7 to produce resultant values. Thereafter, the resultant values within each column of matrix 700 are XOR'ed together to produce a bit of ICV 480. Thus, as shown in Table 2, since matrix 700 includes five columns (N=5), ICV 480 is represented as a five bit result ($ICV_1$-$ICV_5$) and is computed as follows:

Referring to FIGS. 8A and 8B, illustrative flowcharts of the operations for establishing and maintaining low-latency, secure communications between two devices implemented within an electronic system are shown. To establish secure communication between the two devices (e.g., processor 310 and memory device 320 of FIG. 3), for example, two general operations may be performed; namely, (1) mutual authentication (challenge/response protocol) and session key development using the digital certificate chains of the devices, and (2) production of the ICV using the shared session key. These operations may be performed by hardware, software, or firmware.

With respect to the first operation, a cipher engine at a first device (e.g., cipher engine 550 of processor 310 of FIG. 5) issues a challenge to a cipher engine at a second device (e.g., cipher engine 440 of memory device 320 of FIG. 4B) as shown in block 800. For this embodiment, the "challenge" may include a random number and the pre-stored digital certificate chain associated with the processor. The cipher engine of the second device responds by returning at least the random number, either digitally-signed with its internally-stored device-specific private key or otherwise processed under a shared-secret challenge/response protocol. Additionally, the response may include its pre-stored digital certificate (block 805). The use of the digital certificate chains allows the first and second devices to mutually authenticate each other. The challenge/response procedure is then repeated with the roles of the two devices reversed, such that the second device challenges the first device. Thereafter, these cipher engines may operate in accordance with a well-known Diffie-Hellman technique in order to establish a session key between the two devices (block 810).

Alternatively, the challenge/response authentication protocol can be combined with Diffie-Hellman session key establishment in the well-known technique of "authenticated key establishment", wherein the Diffie-Hellman values exchanged are digitally signed.

With respect to the second operation, the session key (or a portion thereof) is input into a cipher engine to produce a pseudo-random data stream (block 815). This data stream is used as a One-Time Pad (OTP). Certain bits of the OTP are selected to populate an integrity matrix or a Toplitz matrix as described above (block 820). The bit selection may be based

TABLE 2

| ICV bit | COMPUTED VALUE |
| --- | --- |
| $ICV_1$ | $m_0 r_0$ XOR $m_1 r_1$ XOR $m_2 r_2$ XOR $m_3 r_3$ XOR $m_4 r_4$ XOR $m_5 r_5$ XOR $m_6 r_6$ |
| $ICV_2$ | $m_0 r_6$ XOR $m_1 r_0$ XOR $m_2 r_1$ XOR $m_3 r_2$ XOR $m_4 r_3$ XOR $m_5 r_4$ XOR $m_6 r_5$ |
| $ICV_3$ | $m_0 r_5$ XOR $m_1 r_6$ XOR $m_2 r_0$ XOR $m_3 r_1$ XOR $m_4 r_2$ XOR $m_5 r_3$ XOR $m_6 r_4$ |
| $ICV_4$ | $m_0 r_4$ XOR $m_1 r_5$ XOR $m_2 r_6$ XOR $m_3 r_0$ XOR $m_4 r_1$ XOR $m_5 r_2$ XOR $m_6 r_3$ |
| $ICV_5$ | $m_0 r_3$ XOR $m_1 r_4$ XOR $m_2 r_5$ XOR $m_3 r_6$ XOR $m_4 r_0$ XOR $m_5 r_1$ XOR $m_6 r_2$ | on predetermined bit locations of the OTP. As shown in FIGS. 6A, 6B and 7, by performing bitwise multiplication on a message and corresponding rows of the matrix followed by separate XOR operations on the resultant values along columns of the matrix, an integrity check value (ICV) is produced (block 825).

Thereafter, if encryption is desired, a different portion of the OTP is logically XOR'ed with a message in its non-encrypted form prior to transmission to a cipher engine at the destination (e.g., cipher engine 440 of second device 320 in FIG. 4A) as shown in blocks 830 and 835. This XOR'ing may be performed in serial bitwise fashion or in parallel with any number of bits in order to encrypt the digital information. Likewise, the ICV may be encrypted through the same XOR operation (blocks 840 and 845). This encryption protocol is extremely efficient because message encryption, ICV computation, and ICV encryption can be theoretically and practically performed in a single clock cycle. The output (the message and ICV) are transferred to the second device (destination) as shown in block 850.

At the destination (second device), cipher engine 440 of FIG. 4A is used to decrypt the incoming information by again XOR'ing that information with identical portions of the identically-generated OTP in order to obtain the information in a non-encrypted form (blocks 855 and 860). This mechanism requires the generation of the two pseudo-random data streams in synchronization, typically assured by always processing the same amount of information at both the second and first devices. This assures that the pseudo-random data stream is "consumed" at a matching rate. Placement of DES into a counter mode provides for easy maintenance of synchronization because the counter values in use by each pseudo-random stream generator need not be kept secret and may be exchanged "in the clear" between the two devices. If synchronization is ever lost, the counter containing the "lower" counter value is simply set forward to match the contents of the other counter. Because the counter can never be "set back", the pseudo-random stream can never be forced to repeat, which is a critical feature to allow its use as an OTP. If the counter ever reaches its maximum value, a new session key must be negotiated to create an entirely new OTP. Note that the above procedures are directed to the use of "DES" cipher, but it is anticipated that other stream ciphers that may not use pseudo-random streams may be employed.

Thereafter, the recovered ICV is compared with the ICV generated at the second device (blocks 865 and 870). If a match is detected, the communications are secure (block 875). Otherwise, communications are insecure (block 880). An error would likely be reported to the user warning that the communications are not secure.

Of course, there exist alternative methods for authentication and session key development. For example, well-known in the art, shared-secret symmetric keys may be used to exchange information in order to produce one or more temporary session keys therefrom. The present invention may utilize this type of authentication method instead of the method described in FIGS. 8A and 8B.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for securing communications between a first device and a second device, the method comprising:

mutually authenticating the first device and the second device;

generating an integrity check value by the first device, wherein the generating comprises:

extracting a selected number of bits from a pseudo-random data stream for use as coefficients of a matrix having M rows and N columns, and performing operations on both contents of the message and the coefficients of the matrix to generate the integrity check value; and sending the integrity check value with a message from the first device to the second device.

2. The method of claim 1, wherein prior to extracting the selected number of bits from the pseudo-random data stream, the method comprises:

inputting keying material into a cipher engine performing operations in accordance with a predetermined stream cipher; and producing the pseudo-random data stream by the cipher engine.

3. The method of claim 2, wherein the predetermined stream cipher is Data Encryption Standard in counter mode.

4. The method of claim 1, wherein the extracting of the selected number of bits includes assigning M bits from the selected number of bits as a first column of the matrix; and reiteratively assigning M unique bits from a remainder of the selected number of bits for each remaining column of the matrix.

5. The method of claim 4, wherein the performing of the operations includes performing arithmetic operations on M bits from the content of the message and corresponding coefficients of the first column of the matrix to produce a first plurality of resultant values; and performing exclusive OR operations between each of the first plurality of resultant values to produce a bit of the integrity check value.

6. The method of claim 5, wherein the arithmetic operations are bitwise multiplication operations.

7. The method of claim of claim 5, wherein the performing of the operations further includes performing arithmetic operations on the M bits from the content of the message with corresponding coefficients for a remaining N-1 columns of the matrix to produce a second plurality of resultant values associated with each of the remaining N-1 columns; and performing exclusive OR operations between resultant values associated with each remaining N-1 column of the matrix to produce N-1 bits of the integrity check value.

8. The method of claim 1, wherein the extracting of the selected number of bits includes assigning M bits from the selected number of bits as a first column of the matrix; and reiteratively reassigning the M bits in accordance with a predetermined bit rotation for columns of the matrix excluding the first column.

9. The method of claim 8, wherein the performing of the operations includes multiplying M bits from the content of the message with corresponding coefficients of the N columns of the matrix to produce a plurality of resultant values associated with each coefficient of the matrix; and performing exclusive OR operations on the plurality of resultant values along the N columns of the matrix to produce N bits of the integrity check value.

10. The method of claim 9, wherein the performing of the operations further includes:

reiteratively computing the integrity check value based on successive groups of bits of the message.

11. A method comprising:

decrypting an incoming message;

computing an integrity check value for the incoming message, the computing of the integrity check value comprises:

producing a pseudo-random data stream, extracting a selected number of bits from the pseudo-random stream for use as coefficients of a matrix, and performing operations on both contents of the message and the coefficients of the matrix to generate the integrity check value; and determining whether the incoming message is valid by comparing the computed integrity check value with a recovered integrity check value accompanying the incoming message.

12. The method of claim 11, wherein the performing operations on both the contents of the message and the coefficients of the matrix to generate the integrity check value includes exclusively OR'ing portions of the incoming message with a predetermined number of bits from the pseudo-random data stream.

13. The method of claim 11, wherein the performing of the operations on both the contents of the message and the coefficients of the matrix during the computing of the integrity check value includes for the matrix having M rows and N columns, where M and N are positive whole numbers, multiplying M bit values of the message with corresponding coefficients of the N columns of the matrix to produce a plurality of resultant values; and performing exclusive OR operations between resultant values associated with each column of the matrix to produce N bits of the integrity check value.

14. The method of claim 11, wherein the performing of the operations on both the contents of the message and the coefficients of the matrix during the computing of the integrity check value includes extracting the selected number of bits from the pseudo-random data stream to generate the matrix having M rows and N columns;

multiplying M bit values of a first group of bits of the message with corresponding coefficients of the N columns of the matrix to produce a plurality of resultant values associated with each of the coefficients; and performing exclusive OR operations between resultant values associated with each of the N columns of the matrix to produce N bits of the integrity check value.

15. The method of claim 12, wherein the bits associated with the selected number of bits differ from the bits associated with the predetermined number of bits.

16. An electronic system comprising:

a first device to generate an integrity check value and transmit the integrity check value along with a message, the first device comprises an integrity check value (ICV) generator to produce the integrity check value based on (i) a selected group of bits from a pseduo-random data stream forming coefficients of a matrix and (ii) contents of the message, and a second device to determine whether the message has been altered by comparing a newly generated integrity check value with the integrity value recovered with a message.

17. The electronic system of claim 16, wherein the first device is a processor that produces the integrity check value being a result of logical operations performed on both the contents of the message and the selected group of bits and the second device is a memory.

18. The electronic system of claim 16, wherein the first device is a cipher engine implemented within a processor and the second device is a cipher engine implemented within a memory.

* * * * *